US008901229B2

(12) United States Patent
Gerace

(10) Patent No.: US 8,901,229 B2
(45) Date of Patent: *Dec. 2, 2014

(54) ROOF COATING CONTAINING PAINT AND METHOD OF MAKING

(75) Inventor: Michael Joseph Gerace, North Charleston, SC (US)

(73) Assignee: Polymer Recycling, LLC, North Charleston, SC (US)

( * ) Notice: Subject to any disclaimer, the term of this patent is extended or adjusted under 35 U.S.C. 154(b) by 189 days.

This patent is subject to a terminal disclaimer.

(21) Appl. No.: 12/207,610

(22) Filed: Sep. 10, 2008

(65) Prior Publication Data

US 2009/0012228 A1  Jan. 8, 2009

Related U.S. Application Data

(63) Continuation-in-part of application No. 11/753,605, filed on May 25, 2007.

(60) Provisional application No. 60/808,894, filed on May 26, 2006.

(51) Int. Cl.
*C08L 9/10* (2006.01)
*C08K 5/12* (2006.01)
*C09D 121/02* (2006.01)
*C08K 5/00* (2006.01)

(52) U.S. Cl.
CPC ............ *C09D 121/02* (2013.01); *C08K 5/0016* (2013.01)
USPC .............................. 524/501; 524/296; 521/41

(58) Field of Classification Search
CPC .... C09D 121/02; C08K 5/0016; C08L 21/02; C08F 218/04; C08F 218/08
USPC ............. 210/930; 252/312, 330; 95/189, 190; 507/110; 428/402, 403, 406; 427/408; 524/268, 204, 205, 280, 457, 565, 567, 524/501, 296; 521/41

See application file for complete search history.

(56) References Cited

U.S. PATENT DOCUMENTS

| | | | |
|---|---|---|---|
| 4,241,107 A | 12/1980 | Mandish et al. | |
| 4,874,432 A | 10/1989 | Kriech et al. | |
| 4,980,030 A | 12/1990 | Johnson et al. | |
| 5,254,256 A * | 10/1993 | Zuerner et al. | 210/639 |
| 5,376,238 A * | 12/1994 | Zambory | 203/11 |
| 5,643,399 A | 7/1997 | Venable | |
| 5,880,218 A | 3/1999 | Gerace et al. | |
| 5,916,392 A | 6/1999 | Ghanbari | |
| 5,922,834 A | 7/1999 | Gerace et al. | |
| 6,218,012 B1 * | 4/2001 | Rota et al. | 428/402 |
| 6,455,598 B1 * | 9/2002 | Gerace et al. | 521/41 |
| 7,128,780 B2 | 10/2006 | Matheson et al. | |
| 2003/0236173 A1 * | 12/2003 | Dobson et al. | 507/110 |
| 2004/0101690 A1 | 5/2004 | Saitoh | |
| 2005/0084334 A1 | 4/2005 | Shi et al. | |
| 2005/0252419 A1 | 11/2005 | Mabey | |
| 2010/0003505 A1 | 1/2010 | Yoon et al. | |

FOREIGN PATENT DOCUMENTS

WO          99/03920 A1    1/1999

OTHER PUBLICATIONS

Stanley Roofing Co., Eterna-Seal System. (2009) Available Online at: http://www.stanleyroofing.com/html/eterna-seal_system.htm.*
Truco, Inc. Eterna-Seal SEBS Rubber Coating 7145. (2009) Available Online at: http://www.truco-inc.com/data/7145.pdf.*
Dow Surfactants- Nonylphenol ethoxylates. (1995) Available Online at: http://www.dow.com/surfactants/products/nonylph.htm.*
Chemindustry.com, Santicizer160 Chemical Info. (1999) Available Online at: http://www.cheminindustry.com/chemicals/524008.html.*
Notice of Allowance pertaining to U.S. Appl. No. 13/221,988 dated Aug. 16, 2012.
Office Action pertaining to U.S. Appl. No. 13/370,371 dated Jun. 5, 2013.
Office Action pertaining to U.S. Appl. No. 13/716,689 dated Jun. 14, 2013.
Non-final Office Action relating to U.S. Appl. No. 13/221,988, dated May 1, 2012.
Restriction Requirement pertaining to U.S. Appl. No. 11/753,605 dated Sep. 28, 2010.
Office Action pertaining to U.S. Appl. No. 11/753,605 dated Dec. 29, 2010.
Notice of Allowance dated Jun. 2, 2011 pertaining to U.S. Appl. No. 11/753,605.

\* cited by examiner

*Primary Examiner* — Ling Choi
*Assistant Examiner* — Ronald Grinsted
(74) *Attorney, Agent, or Firm* — Dinsmore & Shohl LLP

(57) ABSTRACT

An elastomeric roof coating and method of forming the roof coating are provided. The roof coating is formed from oil-based paint which is optionally treated to remove at least a portion of the solvents contained in the paint, and further includes emulsifying the oil-based paint, followed by the addition of varying amounts of water-based paint, a virgin latex polymer, and a plasticizer. Where white or light colored paints are used in the roof coating, the coating provides good reflective properties when applied to a roof surface.

9 Claims, No Drawings

ROOF COATING CONTAINING PAINT AND METHOD OF MAKING

CROSS-REFERENCE TO RELATED APPLICATIONS

This application is a continuation-in-part of U.S. application Ser. No. 11/753,605, filed May 25, 2007, entitled METHOD OF TREATING PAINT WASTE AND ROOFING PRODUCTS CONTAINING PAINT WASTE, which application claims the benefit of U.S. Provisional Application No. 60/808,894, filed May 26, 2006, entitled ROOFING PRODUCTS CONTAINING PROCESSED PAINT WASTE. The entire contents of said applications are hereby incorporated by reference.

BACKGROUND OF THE INVENTION

The present invention relates to a roof coating containing paint, and more particularly, to a reflective roof coating which contains treated paint or paint waste.

Re-roofing an existing roof is an expensive operation, as such an operation typically includes tearing off the existing roof and replacing defective decking, sheathing, insulation, and the like. There is usually a period of time during the re-roofing process in which the inside structure is exposed to outside weather elements; rendering the inside structure vulnerable to water damage.

In order to avoid the expense of removing and replacing an entire roof, an increasing emphasis has been placed on products for extending the life of existing roof structures. Such products include asphalt and coal tar cements, as well as caulking, aluminized asphalt, elastomeric sealers, patching tapes, and the like. However, such systems may contain cold tar derivatives, which are known to contain carcinogenic polynuclear aromatic compounds (PNAs).

Moreover, both in restorative and new construction, there is an increasing demand for roofing systems which contain recycled content. For example, the U.S. Green Building Council has promoted recycling efforts in construction through its "Leadership in Energy and Environment" or LEED program.

In recent years, roofing products have been developed which utilize recycled automotive paint sludge as a polymeric component. See, for example, U.S. Pat. Nos. 6,455,598 and 5,880,218. However, while such products are environmentally friendly, the use of large amounts of paint sludge having an inconsistent composition results in a wide variation in the roofing product composition. For example, paint waste may be collected in a number of different ways and can include a variable mixture of several different components including primers, paints, and solvents. In addition, the paint sludge may include other automotive solid waste materials such as production-related trash, metal parts, and the like.

It has also become desirable in recent years for roof coatings which can be easily cold applied to the roof substrate or the existing roof. Additional benefits may be provided when these coatings are reflective in nature as a means of reducing air conditioning demands and energy costs. Some estimates indicate that 15% of a building's cooling cost can be saved through the proper use of a reflective roof surface.

Therefore, it would be desirable to provide a roof coating which provides good reflective properties.

Accordingly, there is a need in the art for a roof coating which will extend the life of an existing roof and which is cost-effective, environmentally friendly, provides effective sealing and adhesion characteristics, good reflective properties, and has low or no VOC content.

SUMMARY OF THE INVENTION

The embodiments described herein meet those needs by providing a roof coating produced from a mixture of oil-based and water-based paint or paint wastes. The roof coating of the present invention provides an inexpensive and long-term solution to restoring roofs and extending their useful lifetime. In addition, the roof coating is relatively inexpensive as it utilizes paint or paint waste materials which are readily available. The roof coating may be prepared as a reflective coating to minimize heat buildup at the roof surface. The roof coating described herein may be used in roof repair applications as well as in new roof construction.

According to one aspect of the present invention, an elastomeric roof coating is provided which comprises an emulsified oil-based paint; water-based paint; a virgin latex polymer; and a plasticizer.

In one embodiment, the emulsified oil-based paint has been treated prior to emulsification to remove at least a portion of the solvents contained therein such that the roof coating product is low in VOCs, VOC-free, or water-based.

The emulsified oil-based paint has preferably been emulsified with an emulsifier system comprising one or more non-ionic surfactants, and preferably two non-ionic surfactants. A preferred emulsifier system comprises nonyl phenol ethoxylate and polyalkylene glycol monobutyl ether.

In another embodiment, the elastomeric roof coating is reflective. By "reflective," it is meant the coating has the ability to reflect light (including ultraviolet, visible, and near-infrared radiation). In order to provide the desired reflectance for roofing applications, the oil-based and water-based paints used in the coating composition are preferably white or light in color.

The elastomeric roof coating may comprise from about 10% to about 40% by weight of the emulsified oil-based paint (solids and water) and from about 10% to about 30% by weight of the water-based paint.

The virgin latex polymer may comprise a styrenated acrylic polymer. The plasticizer may comprise butyl benzyl phthalate. The roof coating formulation has about 50% solids content.

A method of forming a roof coating is also provided which comprises
providing oil-based paint containing solvents, removing at least a portion of the solvents from the paint such that a paint residue is formed; emulsifying the paint residue with an emulsifier system, and adding a water-based paint, a virgin latex polymer, a plasticizer, and water to the emulsified oil-based paint. In this embodiment, the roof coating is a waterborne coating which contains less than about 30% emulsified solvent with water forming a continuous phase.

The emulsifier system for the paint may comprise one or more non-ionic surfactants. The emulsifier system preferably comprises nonyl phenol ethoxylate and polyalkylene glycol monobutyl ether.

In an alternative embodiment, the method comprises providing oil-based paint containing solvents; emulsifying the oil-based paint with the addition of an emulsifier system; and adding a water-based paint, a virgin latex polymer, a plasticizer, and water to the emulsified oil-based paint. The emulsifier system may comprise one or more non-ionic surfactants, and preferably comprises nonyl phenol ethoxylate and polyalkylene glycol monobutyl ether.

In this embodiment, the elastomeric roof coating is preferably made reflective by using oil-based and water-based paints which are white or light in color.

The resulting elastomeric roof coating may be used as a topcoat for a roofing system and provides good reflective properties.

Accordingly, it is a feature of the present invention to provide an elastomeric roof coating and a method of forming the coating. This, and other features and advantages of the invention will become apparent from the following detailed description and the appended claims.

DETAILED DESCRIPTION OF THE PREFERRED EMBODIMENTS

The oil-based and water-based paint materials used to produce the roof coating can be obtained from several sources including, but not limited to, automotive companies, industrial OEM equipment manufacturers, architectural painting contractors, household paint waste, paint manufacturers (who dispose of off-spec materials and waste products), paint distributors which have accumulated paint which is past its shelf life, painting contractors who accumulate paint residues left over from various paint jobs, and local land fills and collection centers that accept paint waste from consumers. Thus, the term "paint" as used herein is meant to include not only unused paint, but also paint waste that is recovered from a variety of sources.

The oil-based and water-based paints used in the coating formulation are preferably light in color so as to provide the desired reflectance properties when applied to a roof. Preferred colors for use include light gray, white, and variations thereof; light beige, and light yellow.

The roof coating of the present invention is inexpensive to produce and may be processed so as to have a very low VOC content of about 0.1% or less. This is accomplished by subjecting the oil-based paint to agitation under a vacuum at a temperature of about 225° F. and distilling off the solvent to form a paint residue as described in U.S. Pat. Nos. 6,455,598 and 5,880,218, the disclosures of which are incorporated herein by reference.

It should be noted that the extent to which the solvents are removed will depend on the strength of the vacuum and the time and temperature at which solvent distillation proceeds. For a given batch of roof coating, the process conditions can be adjusted to achieve the desired residual solvent levels, depending on the initial solvent level and type of solvents present.

The paint residue formed after the removal of solvents is then emulsified by the addition of one or more non-ionic surfactants. A preferred emulsifier system for use in the invention includes the non-ionic surfactants nonyl phenol ethoxylate and polyalkylene glycol monobutyl ether.

Alternatively, the oil-based paint may also be used directly in the form in which it is provided without the removal of solvents. In this instance, the oil-based paint is emulsified by the addition of the emulsifier system followed by the addition of the remaining components, i.e., water-based paint, virgin latex polymer, and plasticizer. The resulting roof coating is in the form of a water-based coating which contains between about 10 to 30% VOC's.

The water-based paint (latex paint) included in the roof coating may be used directly in the form in which it is collected. However, in instances where the paint comprises paint waste obtained, for example, in a manufacturing process, the paint waste may be screened prior to use to ensure that it is free of particles or other foreign matter. The water-based paint should have a viscosity of between about 1,000 to 3,000 cps and a solids content of about 40% to 80%.

It has been found that the addition of water-based paint to the roof coating composition improves the flow properties of the elastomeric coating. In addition, it has been found that the addition of such water-based paint allows air and water to more readily escape during solid film formation. As a result, the dried roof coating film shows substantially no bubbling or blistering defects after application.

One example of an elastomeric roof coating composition comprises emulsified oil-based paint, water-based paint, a virgin latex polymer, and a plasticizer. The roof coating preferably comprises about 17 to 24% by weight of the emulsified oil-based paint, about 20% water-based paint, about 4% of an emulsifier, about 37% of the virgin latex polymer, and about 2% by weight plasticizer.

A suitable virgin latex polymer is a styrenated acrylic polymer, available from Union Carbide under the designation UCAR 123. The plasticizer may comprise butyl benzyl phthalate. The elastomeric roof coating formulation has about 50% solids content.

The roof coating is preferably formed by phase-inverting the oil-based paint by slowly adding the emulsifier system (surfactants) along with warm water prior to the addition of the water-based paint and other components. It should be appreciated that the same emulsifier system may be used for the emulsification step regardless of whether or not solvent is removed from the paints. In either instance, water becomes the continuous phase. In the case where solvents are not removed from the paint prior to emulsification, the water will contained emulsified solvent.

The roof coating may be applied as a final topcoat to an entire roof surface. The resulting dry elastomeric film forms a membrane and is bonded directly to the underlying roofing layer.

Where the roof coating has been prepared with light-colored paints, the coating complies with the standard of solar reflectance specified by the U.S. EPA's Energy Star Program for roof products (ASTM C1549), i.e., the initial solar reflectance is greater than or equal to 0.65 and at least 0.50 three years after installation, where an albedo value of 0.0 indicates that the surface absorbs all solar radiation, and an albedo value of 1.0 represents total reflectivity. It should be appreciated that as some paint ingredients vary in solar reflectance properties and the properties they impart to the roof sealant, it may be desirable to add an amount of titanium dioxide to the sealant formulation in order to meet the reflectance specifications. For example, the reflectance of the roof coating may be measured, and titrated with titanium dioxide, if necessary, to achieve the desired reflectance level.

In order that the invention may be more readily understood, reference is made to the following examples of compositions within the scope of the present invention, which examples are intended to be illustrative of the invention, but are not intended to be limiting in scope.

EXAMPLE 1

An elastomeric roof coating was prepared. In a consumer grade Kitchen Aid mixer equipped with a 4 quart mixing bowl, 5.08 pounds of oil-based paint waste which was gray in color (obtained from Charleston County Bees Ferry Land Fill, Charleston, S.C.) was added along with 0.13 pounds of Santicizer 160 plasticizer, 0.18 pounds of Tergitol-XD surfactant, and 0.06 pounds of T-Det N-20 surfactant. The components were mixed together for 15 minutes. While still mixing, 0.32 pounds of water was added followed by the addition of 1.68 pounds of water-based latex paint which was beige in color (obtained from Charleston County Bees Ferry Land Fill) with mixing for 2 minutes. 4.2 pounds of virgin latex polymer (UCAR 123 polymer) was added and mixed for 10 minutes. The finished coating was then screened through a 20-mesh screen and packaged for use.

EXAMPLE 2

An elastomeric roof coating was prepared by adding 5.08 pounds of white oil-based paint waste (obtained from Lord and Evans Paints, Charleston, S.C.) was added along with 0.13 pounds of Santicizer 160 plasticizer, 0.18 pounds of Tergitol-XD surfactant, and 0.06 pounds of T-Det N-20 surfactant to a consumer grade KitchenAid mixer equipped with a 4 quart mixing bowl. The components were mixed together for 15 minutes. While still mixing, 0.32 pounds of water was added followed by the addition of 1.68 pounds of white water-based latex paint (obtained from Lord and Evans Paints, Charleston, S.C.) with mixing for 2 minutes. 4.2 pounds of virgin latex polymer (UCAR 123 polymer) was added and mixed for 10 minutes. The finished coating was then screened through a 20-mesh screen and packaged for use.

Having described the invention in detail and by reference to preferred embodiments thereof, it will be apparent that modifications and variations are possible without departing from the scope of the invention.

What is claimed is:

1. An elastomeric roof coating comprising:
   from about 10% to about 40% by weight of the total composition of an emulsified oil-based paint prepared from oil-based paint containing solvents or oil-based paint which has been treated to remove at least a portion of solvents contained therein;
   from about 10% to about 30% by weight of the total composition of a water-based paint having a solids content of about 40% to 80% by weight of the water-based paint comprising unused paint or paint waste used directly in the form in which it is collected;
   a virgin latex polymer; and
   a plasticizer;
   wherein said roof coating has a solids content of about 50% by weight of the total composition.

2. The roof coating of claim 1 wherein said roof coating is reflective.

3. The roof coating of claim 1 wherein said oil-based paint has been emulsified with an emulsifier system comprising one or more non-ionic surfactants.

4. The roof coating of claim 3 wherein said emulsifier system comprises nonyl phenol ethoxylate and polyalkylene glycol monobutyl ether.

5. The roof coating of claim 1 wherein said virgin latex polymer comprises a styrenated acrylic polymer.

6. The roof coating of claim 1 wherein said plasticizer comprises butyl benzyl phthalate.

7. The roof coating of claim 1 wherein said water-based paint has been screened prior to use to remove particles or foreign matter therefrom.

8. An elastomeric roof coating consisting essentially of:
   from about 10 to about 40% by weight of an emulsified oil-based paint;
   from about 10 to about 30% by weight of a water-based paint;
   about 37% by weight of a virgin latex polymer; and
   about 2% by weight of a plasticizer.

9. The roof coating of claim 1, wherein upon application to a roof, exhibits an initial solar reflectance greater than or equal to 0.65.

* * * * *